(12) United States Patent
Vick, Jr. et al.

(10) Patent No.: US 8,038,120 B2
(45) Date of Patent: Oct. 18, 2011

(54) MAGNETICALLY COUPLED SAFETY VALVE WITH SATELLITE OUTER MAGNETS

(75) Inventors: James D. Vick, Jr., Dallas, TX (US); Jimmie R. Williamson, Jr., Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1118 days.

(21) Appl. No.: 11/618,489

(22) Filed: Dec. 29, 2006

(65) Prior Publication Data

US 2008/0157014 A1 Jul. 3, 2008

(51) Int. Cl.
*F16K 31/08* (2006.01)

(52) U.S. Cl. .......................... 251/65; 166/66.5; 335/306

(58) Field of Classification Search ............... 251/65; 166/332.8, 66.5, 662.1; 335/229–234, 306
See application file for complete search history.

(56) References Cited

U.S. PATENT DOCUMENTS

| | | | |
|---|---|---|---|
| 3,196,948 A | 7/1965 | Dye | |
| 3,666,030 A | 5/1972 | Bohn | |
| 3,731,742 A | 5/1973 | Sizer et al. | |
| 4,058,166 A | 11/1977 | Crickmer | |
| RE30,110 E | 10/1979 | Huesbach et al. | |
| 4,191,248 A | 3/1980 | Huebsch et al. | |
| 4,407,329 A | 10/1983 | Huebsch et al. | |
| 4,467,870 A | 8/1984 | Langham | |
| 4,579,177 A | 4/1986 | Going, III | |
| 4,619,323 A | 10/1986 | Gidley | |
| 4,624,443 A * | 11/1986 | Eidsmore | 251/65 |
| 4,649,993 A | 3/1987 | Going, III | |
| 4,667,736 A | 5/1987 | Rumbaugh et al. | |
| 4,725,783 A | 2/1988 | Miyairi et al. | |
| 4,732,225 A | 3/1988 | Jurgens et al. | |
| 4,796,708 A | 1/1989 | Lembcke | |
| 4,798,247 A | 1/1989 | Deaton et al. | |
| 4,886,114 A | 12/1989 | Perkins et al. | |
| 4,940,207 A | 7/1990 | Katsuyama | |
| 4,981,173 A | 1/1991 | Perkins et al. | |
| 5,070,595 A | 12/1991 | Perkins et al. | |
| 5,070,944 A | 12/1991 | Hopper | |

(Continued)

FOREIGN PATENT DOCUMENTS

DE 4214848 11/1993

(Continued)

OTHER PUBLICATIONS

International Search Report for International Patent Application No. PCT/US2007/088924, dated Jul. 1, 2008, (2 pages).

(Continued)

*Primary Examiner* — John Fristoe, Jr.
*Assistant Examiner* — Andrew J Rost
(74) *Attorney, Agent, or Firm* — Marlin R. Smith

(57) ABSTRACT

A magnetically coupled safety valve with satellite outer magnets. A safety valve includes a housing having multiple chambers extending longitudinally in a pressure bearing wall of the housing, and multiple magnetic devices, each of the magnetic devices being reciprocably disposed in a corresponding one of the chambers. Another safety valve includes multiple first magnetic devices, a second magnetic device magnetically coupled to the first magnetic devices, with the first magnetic devices being circumferentially spaced apart and encircling the second magnetic device. Yet another safety valve includes a housing having a pressure bearing wall, and multiple magnetic devices, each of the magnetic devices being reciprocably disposed in the housing wall, and each of the magnetic devices being completely surrounded by the housing wall.

27 Claims, 8 Drawing Sheets

U.S. PATENT DOCUMENTS

| | | | |
|---|---|---|---|
| 5,257,663 A | 11/1993 | Pringle et al. |
| 5,291,947 A | 3/1994 | Stracke |
| 5,293,551 A | 3/1994 | Perkins et al. |
| 5,299,640 A | 4/1994 | Streich et al. |
| 5,310,012 A | 5/1994 | Cendre et al. |
| 5,409,031 A | 4/1995 | McGill |
| 5,558,153 A | 9/1996 | Holcombe et al. |
| 5,620,048 A | 4/1997 | Beauquin |
| 5,734,209 A | 3/1998 | Hallidy |
| 5,913,337 A | 6/1999 | Williams et al. |
| 5,917,774 A | 6/1999 | Waldow et al. |
| 6,016,845 A | 1/2000 | Quigley et al. |
| 6,041,857 A | 3/2000 | Carmody et al. |
| 6,112,809 A | 9/2000 | Angle |
| 6,237,693 B1 | 5/2001 | Deaton |
| 6,253,843 B1 | 7/2001 | Rawson |
| 6,302,210 B1 | 10/2001 | Crow et al. |
| 6,310,829 B1 | 10/2001 | Green et al. |
| 6,321,845 B1 | 11/2001 | Deaton |
| 6,352,118 B1 | 3/2002 | Dickson et al. |
| 6,361,299 B1 | 3/2002 | Quigley et al. |
| 6,433,991 B1 | 8/2002 | Deaton et al. |
| 6,478,090 B2 | 11/2002 | Deaton |
| 6,491,106 B1 | 12/2002 | Simonds |
| 6,561,278 B2 | 5/2003 | Restarick et al. |
| 6,568,470 B2 | 5/2003 | Goodson, Jr. et al. |
| 6,619,388 B2 | 9/2003 | Dietz et al. |
| 6,626,244 B2 | 9/2003 | Powers |
| 6,748,977 B2 | 6/2004 | Berto |
| 6,863,124 B2 | 3/2005 | Araux et al. |
| 6,988,556 B2 | 1/2006 | Vick, Jr. |
| 7,059,194 B1 * | 6/2006 | Lueck et al. | 137/554 |
| 2002/0023759 A1 | 2/2002 | Deaton |
| 2002/0108747 A1 | 8/2002 | Dietz et al. |
| 2002/0112861 A1 | 8/2002 | Restarick et al. |
| 2003/0015319 A1 | 1/2003 | Green et al. |
| 2003/0019622 A1 | 1/2003 | Goodson et al. |
| 2003/0047317 A1 | 3/2003 | Powers |
| 2003/0132003 A1 * | 7/2003 | Arauz et al. | 166/370 |
| 2003/0155131 A1 * | 8/2003 | Vick, Jr. | 166/375 |
| 2003/0192687 A1 | 10/2003 | Goodson et al. |
| 2005/0087335 A1 | 4/2005 | Vick, Jr. |
| 2006/0043972 A1 | 3/2006 | Williamson, Jr. |

FOREIGN PATENT DOCUMENTS

| | | |
|---|---|---|
| EP | 0436214 | 2/1996 |
| EP | 0997676 | 5/2000 |
| FR | 2480360 | 10/1981 |
| FR | 2509804 | 1/1983 |
| GB | 2186667 | 8/1987 |
| GB | 2200775 | 8/1988 |
| GB | 2241302 | 8/1991 |
| GB | 2362407 | 11/2001 |
| GB | 2379562 | 12/2003 |
| GB | 2390750 | 1/2004 |
| JP | 11093883 | 4/1995 |
| WO | WO0053890 | 9/2000 |

OTHER PUBLICATIONS

Written Opinion for International Patent Application No. PCT/US2007/088924, dated Jul. 1, 2008, (4 pages).
Examination Report issued Dec. 20, 2010, for UK Patent Application No. 0910213.8, 2 pages.
Festo Pneumatic Products Catalog, 2nd Edition, p. 1.292, Double-Acting Rodless Cylinder Type DGO-... PPV-A, dated 1986.
Permanent Magnet Design and Application Handbook, 2nd Edition, p. 9 & 21, dated 1995.
Halliburton Completion Products Catalog, pp. 4-6 & 4-7, dated 1996.
Office Action for U.S. Appl. No. 10/990,748 dated Apr. 15, 2005.
Office Action for U.S. Appl. No. 10/078,839 dated Aug. 22, 2003.
Office Action for U.S. Appl. No. 10/078,839 dated Jan. 21, 2004.
Office Action for U.S. Appl. No. 10/078,839 dated Jun. 10, 2004.
Office Action for U.S. Appl. No. 10/078,839 dated Sep. 17, 2004.
Office Action for U.S. Appl. No. 10/078,839 dated May 12, 2005.
Office Action for U.S. Appl. No. 10/194,197 dated Dec. 2, 2005.
Examination report for GB 0303480.8, dated Jan. 19, 2005.
Combined Search and Examination Report for U.K. application No. GB 0518146.6, dated Nov. 21, 2005.
Office Action for U.S. Appl. No. 10/990,748 dated Mar. 23, 2006.
Office Action for U.S. Appl. No. 10/194,197 dated May 9, 2006.
Office Action for U.S. Appl. No. 10/990,748 dated Sep. 8, 2005.
Office Action for U.S. Appl. No. 10/990,748 dated Oct. 26, 2005.
Office Action for U.S. Appl. No. 11/471,053 dated Apr. 30, 2007.
Office Action for U.S. Appl. No. 10/990,748 dated Aug. 21, 2006.
Dexter Magnetic Technologies, "Magnetically Geared and Sprung Safety Valve", existed prior to Dec. 29, 2006, 1 pages.

* cited by examiner

MAGNETICALLY COUPLED SAFETY VALVE WITH SATELLITE OUTER MAGNETS

BACKGROUND

The present invention relates generally to equipment utilized and operations performed in conjunction with a subterranean well and, in an embodiment described herein, more particularly provides a magnetically coupled safety valve with satellite outer magnets.

Operation of a safety valve using magnetic coupling across a pressure isolation barrier has been described in U.S. Pat. No. 6,988,556. The entire disclosure of this prior patent is incorporated herein by this reference.

A magnetic coupling force generated between two sets of annular shaped magnets in the prior patent is dependent mainly on the volume of magnetic material and the separation between the annular magnets. Unfortunately, space is very restricted in a downhole environment, which particularly limits the available volume in a safety valve, and when high pressure differentials need to be resisted by the pressure isolation barrier, these factors cause the magnetic coupling force to be significantly reduced.

Therefore, it may be seen that improvements are needed in the art of magnetically coupled safety valves. It is among the objects of the present invention to provide such improvements.

SUMMARY

In carrying out the principles of the present invention, a safety valve is provided which solves at least one problem in the art. One example is described below in which multiple "satellite" magnetic devices are positioned surrounding an inner magnetic device attached to an operating member of the safety valve. Another example is described below in which the satellite magnetic devices displace within a pressure bearing wall of a housing of the safety valve.

In one aspect of the invention, a safety valve is provided which includes a housing having multiple chambers extending longitudinally in a pressure bearing wall of the housing. Each of multiple magnetic devices is reciprocably disposed in a corresponding one of the chambers.

In another aspect of the invention, a safety valve is provided which includes multiple magnetic devices. Another magnetic device is magnetically coupled to the first magnetic devices. The first magnetic devices are circumferentially spaced apart and encircle the second magnetic device.

In yet another aspect of the invention, a safety valve is provided which includes a housing having a pressure bearing wall, and multiple magnetic devices. Each of the magnetic devices is reciprocably disposed in the housing wall, and each of the magnetic devices is completely surrounded by the housing wall.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figures 1, 5:
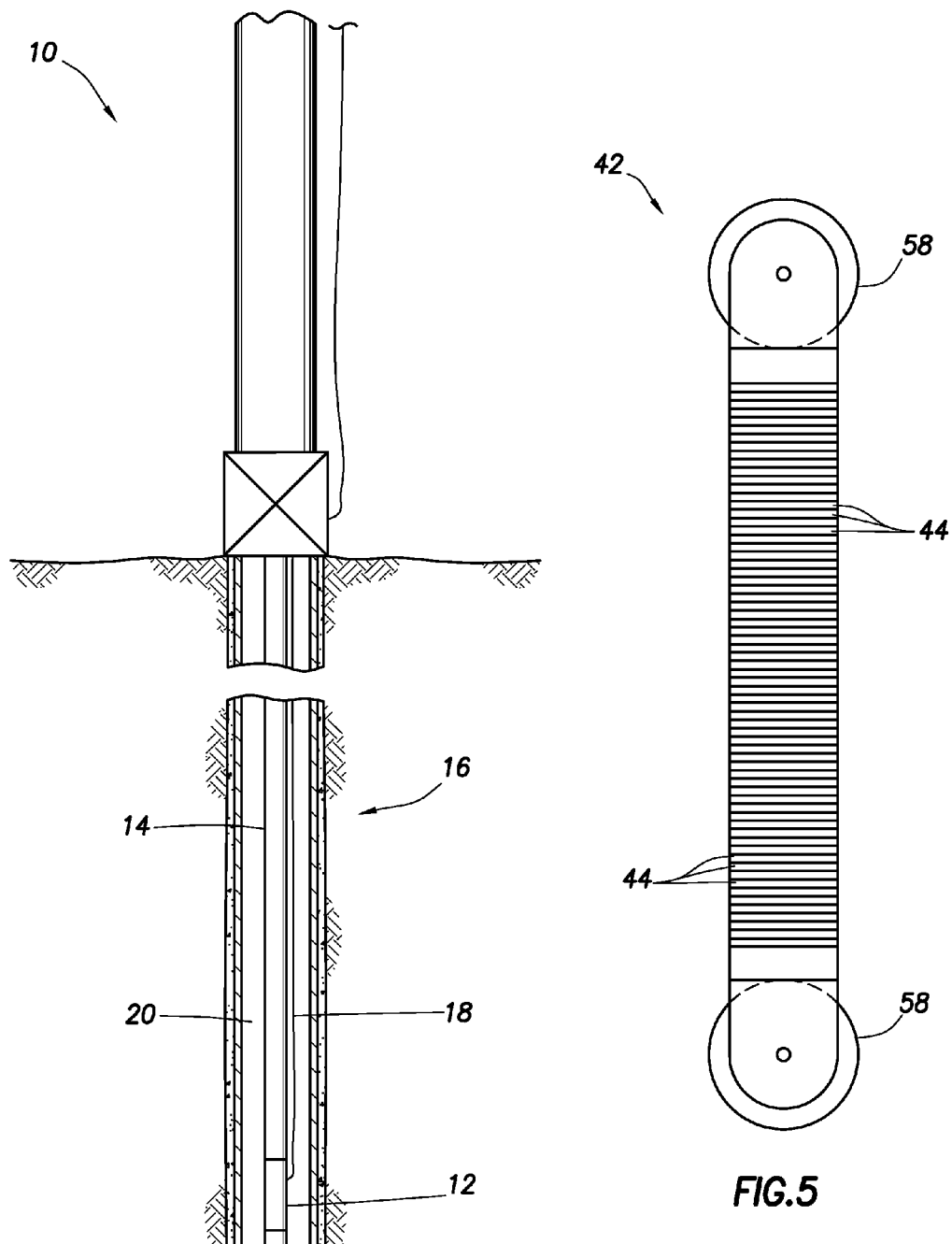
FIG. 1 is a schematic partially cross-sectional view of a well system embodying principles of the present invention.
FIG. 5 is an enlarged scale schematic side view of a satellite magnetic device of the safety valve.

Representatively illustrated in FIG. 1 is a well system 10 which embodies principles of the present invention. A safety valve 12 is interconnected in a tubular string 14 as part of a production assembly 16 positioned in a wellbore 20. A line 18 is used to control operation of the safety valve 12 from a remote location, such as the earth's surface.

The line 18 may be a hydraulic, electrical, optical, or other type or combination of line(s). Alternatively, operation of the safety valve 12 may be controlled from the remote location using telemetry, such as electromagnetic, acoustic, pressure pulse, or other type of telemetry, in which case the line 18 may not be used.

The safety valve 12 is used to selectively permit and prevent flow of fluid through a flow passage 22 (not visible in FIG. 1, see FIG. 2) of the tubular string 14 which extends through the safety valve. Specifically, in emergency situations the safety valve 12 is used to close off the passage 22 and thereby prevent uncontrolled flow of hydrocarbons to the surface via the tubular string 14.

However, it should be clearly understood that the well system 10 as depicted in FIG. 1 and described herein is only one of the many applications for the principles of the present invention. A large variety of different well systems and other applications may incorporate the principles of the invention, and so it will be appreciated that the invention is not limited in any respect to the details of the well system 10.

Figure 2:
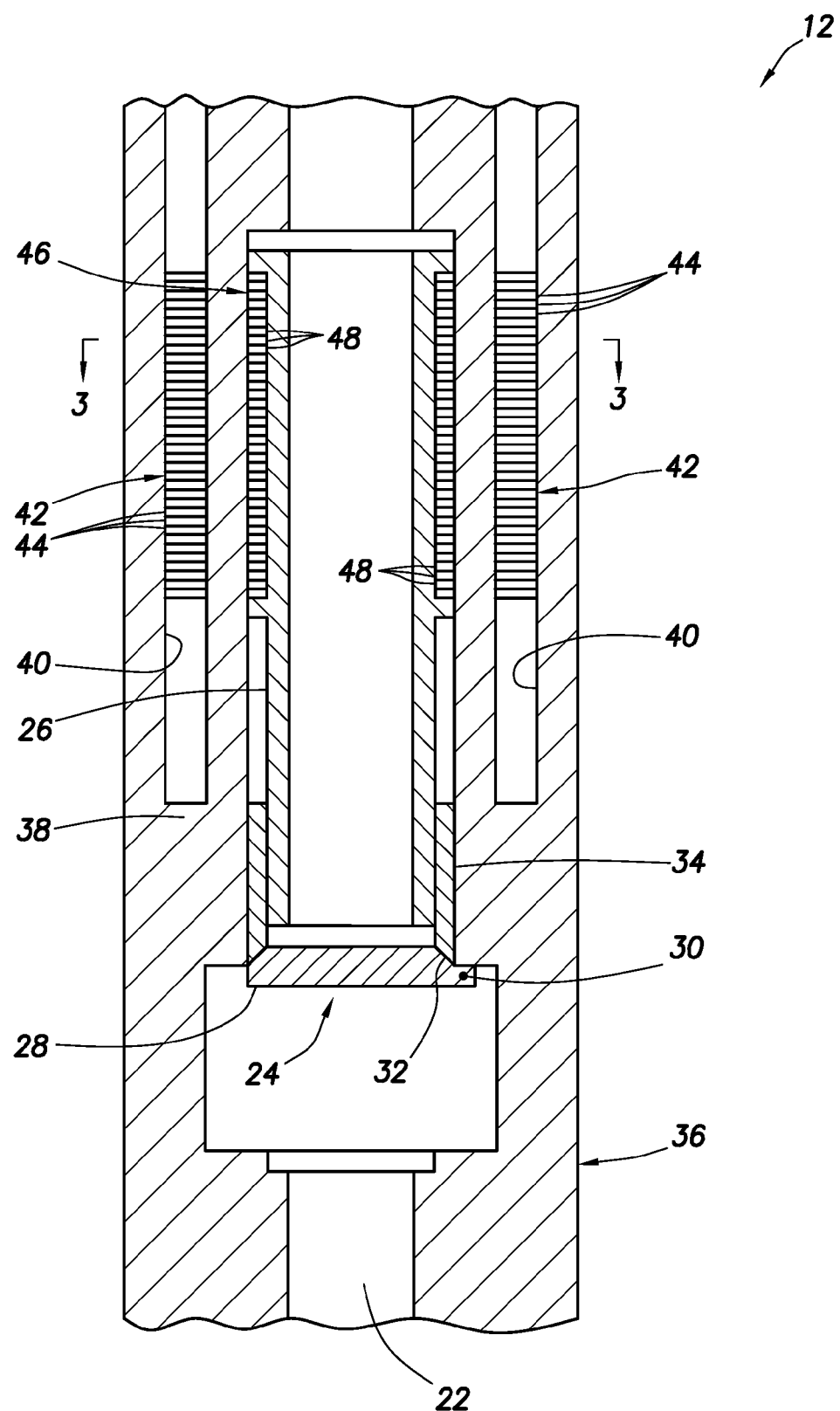
FIG. 2 is an enlarged scale schematic cross-sectional view of a portion of a safety valve embodying principles of the present invention.

Referring additionally now to FIG. 2, an enlarged scale schematic cross-sectional view of a longitudinal portion of the safety valve 12 is representatively illustrated. In this view it may be seen that the safety valve 12 includes a closure assembly 24 which is operated by displacing an operating member 26 to selectively permit and prevent flow through the passage 22.

The closure assembly 24 in this embodiment includes a flapper 28 which rotates about a pivot 30 relative to a sealing surface 32 formed on a seat 34. As depicted in FIG. 2, the operating member 26 is in its upwardly displaced position and the flapper 28 sealingly engages the sealing surface 32 to prevent flow through the passage 22.

However, when the operating member 26 is displaced downward, the operating member will contact the flapper 28 and rotate the flapper downward about the pivot 30, thereby permitting flow through the passage 22. As described more fully below, a magnetic coupling is used to displace the operating member 26 between its upwardly and downwardly displaced positions to thereby selectively prevent and permit flow through the passage 22.

The operating member 26 is of the type known to those skilled in the art as a flow tube or opening prong. The operating member 26 may include features in addition to those depicted in FIG. 2, such as a spring-loaded nose, etc. In addition, other types of operating members may be used, without departing from the principles of the invention.

Other types of closure assemblies may also be used in place of the closure assembly 24. For example, a ball valve type of closure assembly could be used in place of the flapper type closure assembly 24. Thus, it should be clearly understood that the principles of the invention are not limited in any manner to the details of the safety valve 12 described herein.

The operating member 26 and closure assembly 24 are contained within a generally tubular housing 36. Although the housing 36 is schematically depicted in FIG. 2 as being a single component of the safety valve 12, it will be appreciated that the housing could instead be made up of multiple interconnected components to thereby form a housing assembly.

The housing 36 includes a pressure bearing wall 38. In this embodiment, the wall 38 is exposed to pressure in the wellbore 20 external to the housing 36 when used in the well system 10, and the wall is exposed to pressure in the passage 22. Thus, the wall 38 is a pressure isolation barrier which resists any pressure differential between the passage 22 and the wellbore 20 external to the safety valve 12.

Multiple circumferentially spaced and longitudinally extending chambers 40 are formed in the wall 38. Reciprocably disposed within each of the chambers 40 is a magnetic device 42. The magnetic devices 42 are representatively illustrated in FIG. 2 as including multiple stacked disk shaped permanent magnets 44, but other types of magnetic devices may be used if desired.

The magnetic devices 42 are magnetically coupled to another magnetic device 46 attached to the operating member 26. The magnetic device 46 is depicted in FIG. 2 as including multiple stacked annular shaped permanent magnets 48, but other types of magnetic devices may be used if desired.

A resulting magnetic coupling force between the magnetic devices 42, 46 causes the magnetic devices to displace together, i.e., displacement of the magnetic device 46 is fixed to displacement of the magnetic devices 42. As described more fully below, an actuator of the safety valve 12 is used to displace the magnetic devices 42, and thereby displace the magnetic device 46 and the attached operating member 26, to operate the safety valve.

Figure 3:
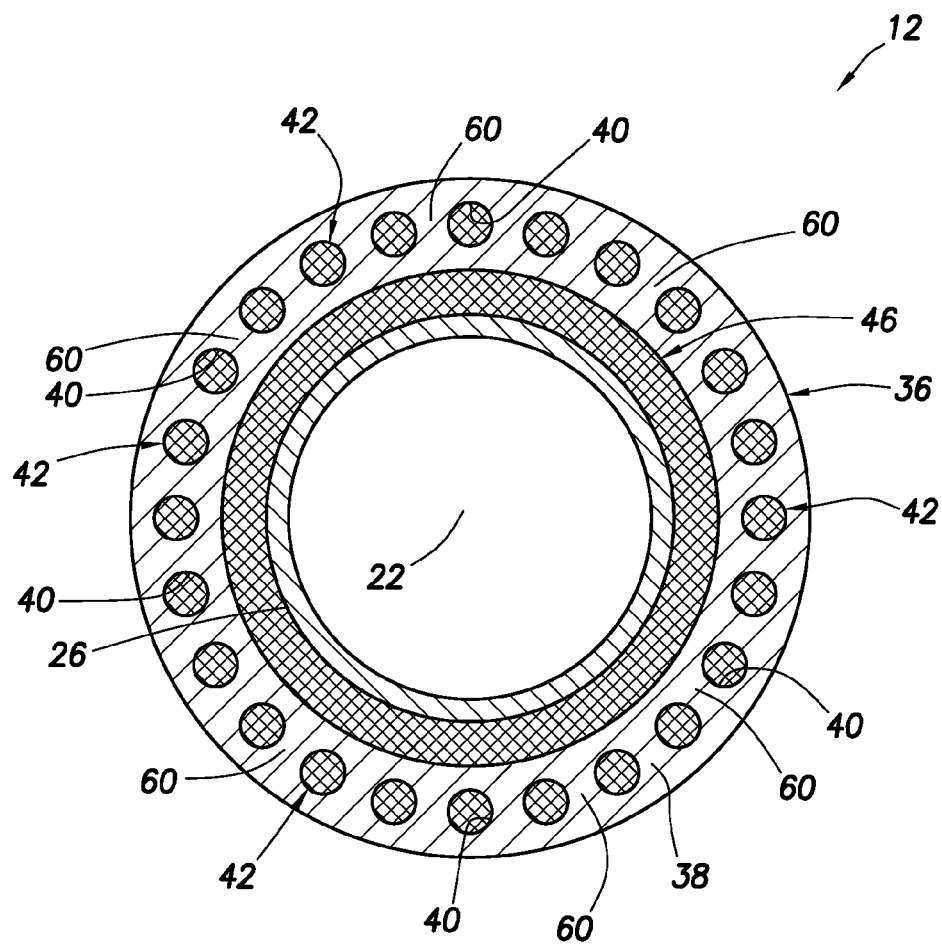
FIG. 3 is a schematic cross-sectional view of the safety valve, taken along line 3-3 of FIG. 2.

A somewhat enlarged scale cross-sectional view of the safety valve 12 is representatively illustrated in FIG. 3. In this view the manner in which the chambers 40 and magnetic devices 42 are circumferentially spaced apart in the housing wall 38 may be clearly seen. The housing wall 38 is preferably made of a non-magnetic material, so that it does not interfere with the magnetic coupling between the magnetic devices 42, 46.

Note that the housing wall 38 is more structurally rigid and more capable of resisting the pressure differential between the passage 22 and the wellbore 20 exterior to the safety valve 12, as compared to the use of separate walls to separately resist these pressure differentials. This due in part to the wall 38 being radially thicker in those portions of the wall which completely surround the chambers 40 and magnetic devices 42.

Because of this increased structural integrity of the wall 38, the magnetic devices 42 can be positioned relatively close to the magnetic device 46, thereby increasing the magnetic coupling force between the magnetic devices 42, 46. Although twenty-four of the magnetic devices 42 are depicted in FIG. 3, greater or lesser numbers of the magnetic devices may be used in keeping with the principles of the invention.

Figure 4:
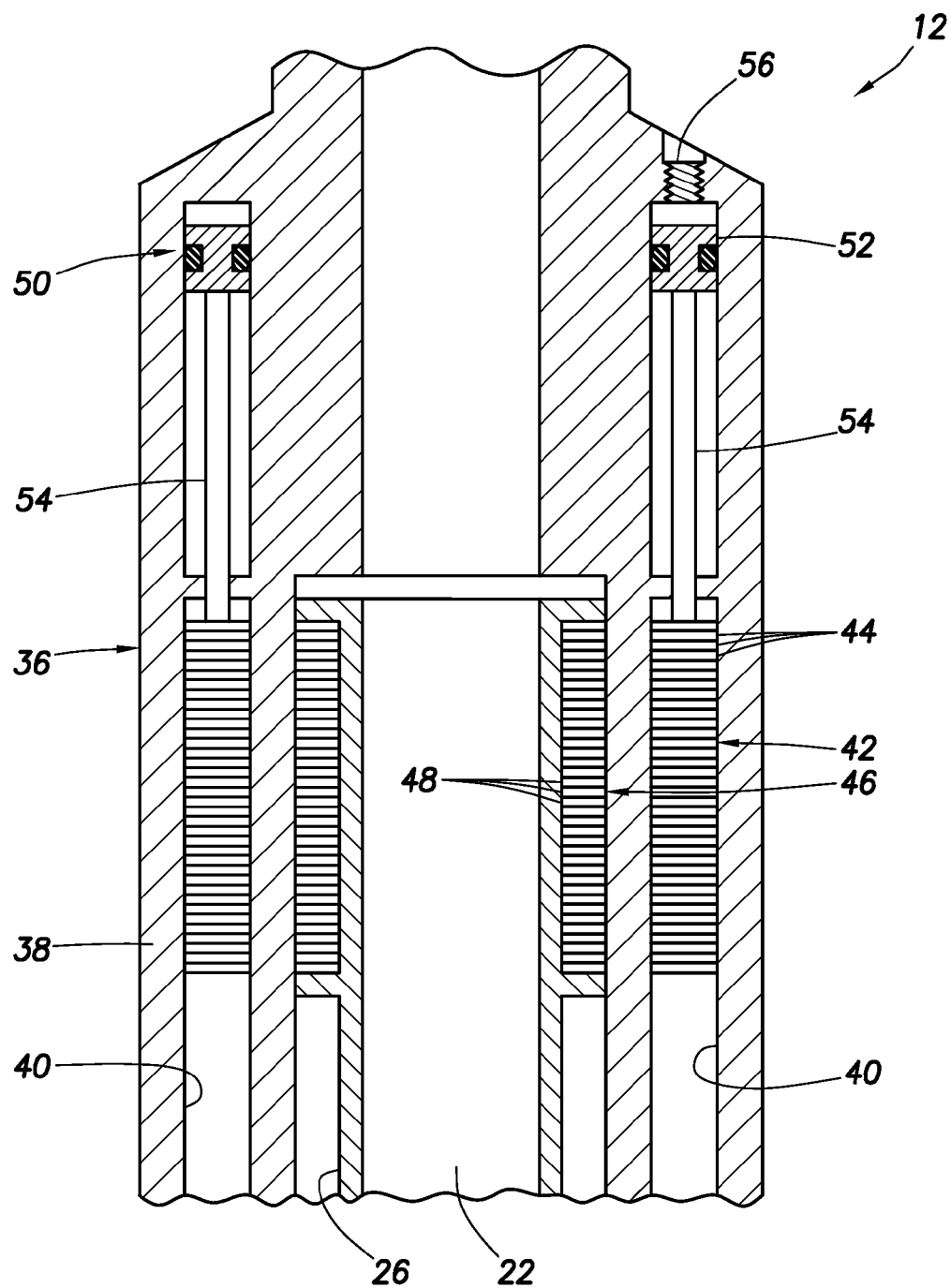
FIG. 4 is a schematic cross-sectional view of an actuator portion of the safety valve.

Referring additionally now to FIG. 4, another cross-sectional view of the safety valve 12 is representatively illustrated, showing an actuator 50 of the safety valve. It should be clearly understood, however, that the actuator 50 is described herein as only one example of many different types of actuators which may be used in keeping with the principles of the invention. For example, various types of electrical, hydraulic, optical and other types of actuators may be used instead of the actuator 50.

The actuator 50 includes an annular piston 52 attached to each of the magnetic devices 42. The piston 52 is depicted in FIG. 4 as being attached to the magnetic devices 42 using actuator members 54 in the form of rods interconnected between the piston and the magnetic devices, but other attachment methods may be used if desired.

Pressure is applied to displace the piston 52 by means of a port 56. For example, the line 18 illustrated in FIG. 1 could be connected to the port 56.

A pressure differential across the piston 52 may be applied to displace the piston upwardly or downwardly to produce corresponding simultaneous displacement of the magnetic devices 42. This displacement of the magnetic devices 42 causes corresponding displacement of the magnetic device 46 and operating member 26 to operate the safety valve 12.

To create a pressure differential across the piston 52, a lower side of the piston may be in fluid communication with the flow passage 22, with the wellbore 20 external to the safety valve, with another line, with a pressure chamber in the safety valve, etc. Thus, it will be appreciated that many different ways of constructing the actuator 50 may be used in keeping with the principles of the invention.

Referring additionally now to FIG. 5, an enlarged scale side view of one of the magnetic devices 42 is representatively illustrated apart from the remainder of the safety valve 12. In this view it may be seen that the magnetic device 42 may include rollers 58 or any other type of friction reducing device in order to reduce the force required to displace the magnetic devices in the chambers 40.

Figure 6:
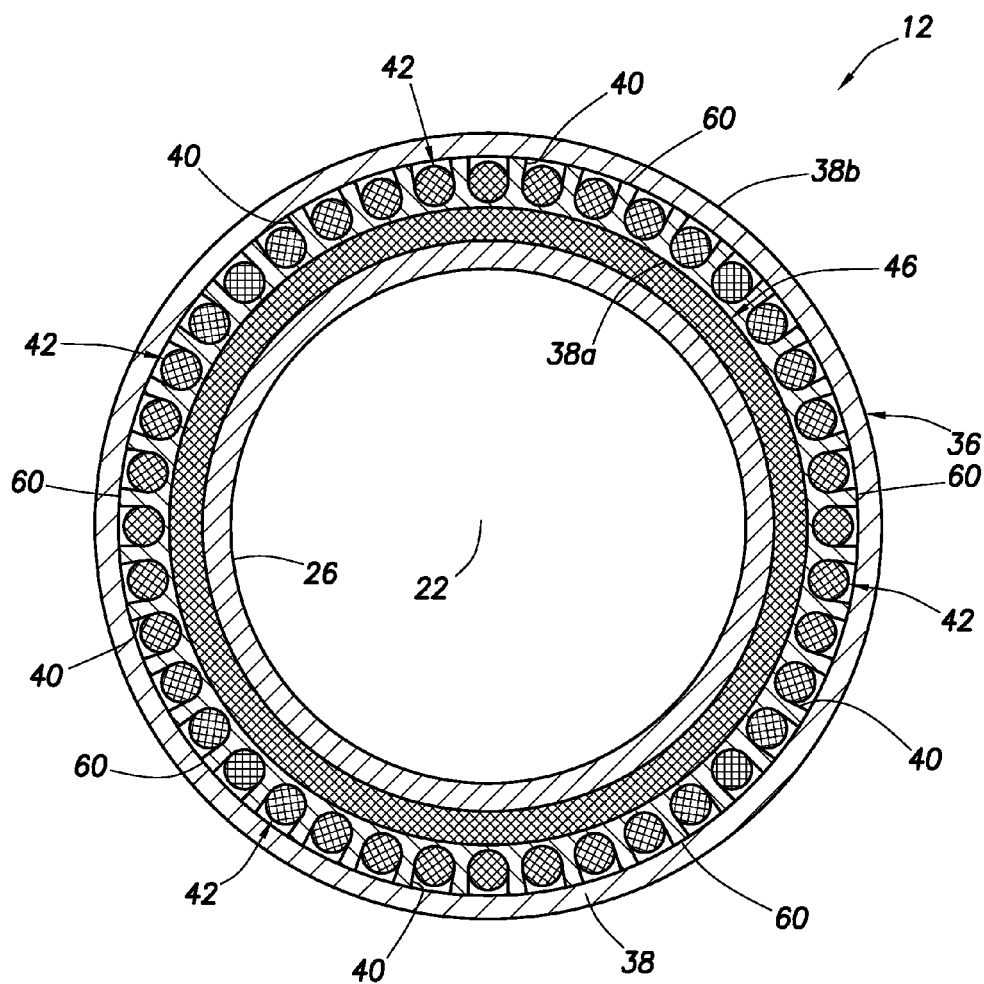
FIG. 6 is a schematic cross-sectional view of an alternate configuration of the safety valve.

Referring additionally now to FIG. 6, a schematic cross-sectional view of an alternate configuration of the safety valve 12 is representatively illustrated. This cross-sectional view is very similar to that illustrated in FIG. 3, except that the housing 36 has been modified in the FIG. 6 embodiment.

The housing wall 38 in the FIG. 6 embodiment includes an inner wall 38a and an outer wall 38b. This configuration makes manufacturing of the housing 36 more convenient, since the chambers 40 can be formed by milling longitudinal recesses in the exterior of the inner wall 38a (for example, using a ball end mill, etc.), and then radially outwardly closing off the recesses with the outer wall 38b. The inner and outer walls 38a, 38b may be joined to each other above and below the chambers 40 by various methods, such as threading, welding, etc.

The inner and outer walls 38a, 38b still resist the pressure differential between the passage 22 and the exterior of the safety valve 12. The inner and outer walls 38a, 38b can support each other in resisting this pressure differential due to structural supports 60 between the chambers 40 which provide engagement between the inner and outer walls.

The supports 60 are depicted in FIG. 6 as being integrally formed with the inner wall 38a, but the supports could also, or alternatively, be formed as part of the outer wall 38b (for example, the chambers 40 could be formed partially on the inner wall and partially in the outer wall). As another alternative, the supports 60 could be formed separate from both of the inner and outer walls 38a, 38b. In the alternative depicted in FIG. 3, the supports 60 are integrally formed as part of the wall 38.

Figure 7:
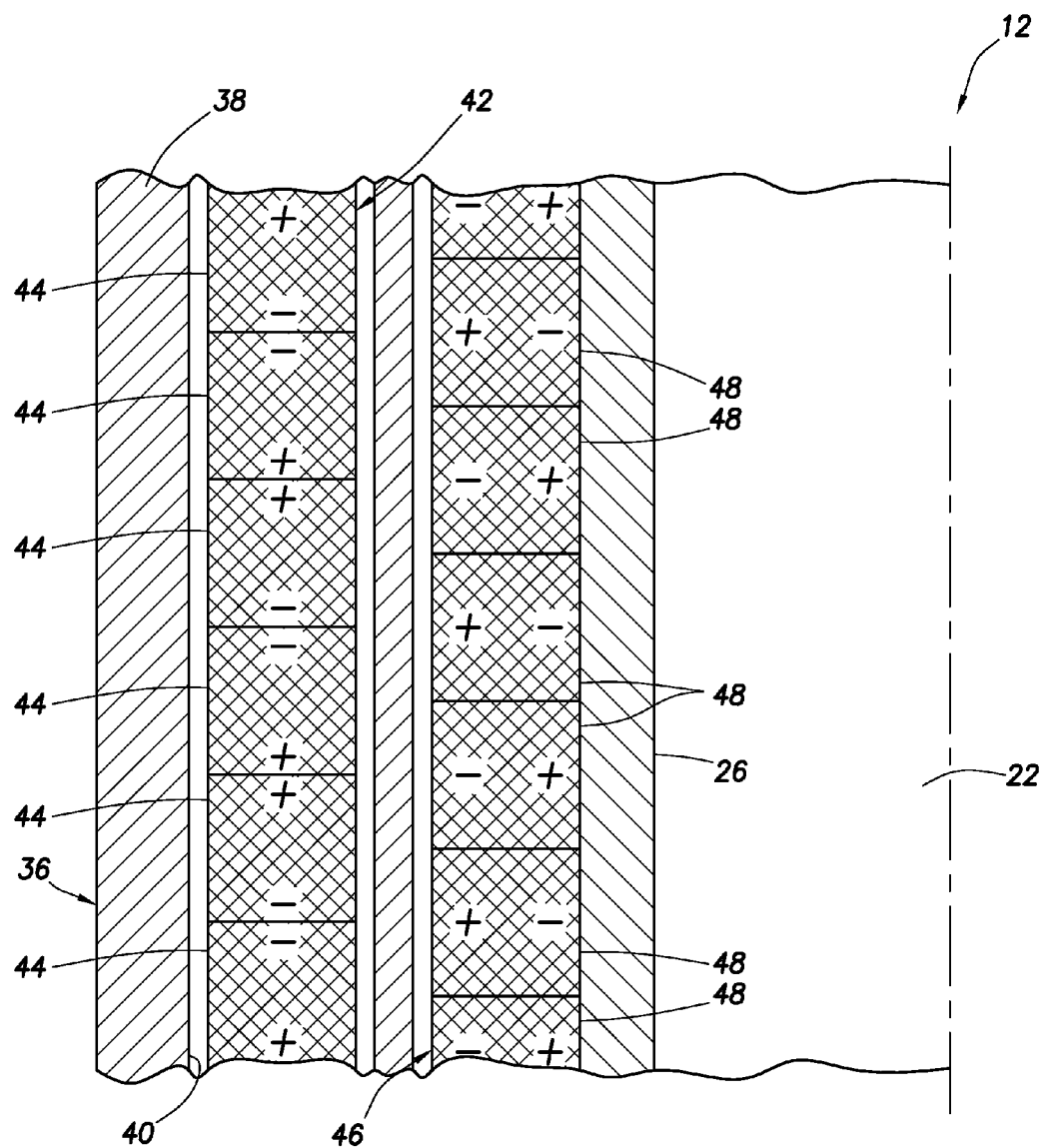
FIGS. 7-9 are schematic quarter-sectional views of alternate arrangements of magnetic devices in the safety valve.

Referring additionally now to FIG. 7, an enlarged scale schematic quarter-sectional view of the safety valve 12 is representatively illustrated. This view is similar to the view of FIG. 2, but at a larger scale so that an arrangement of the magnetic devices 42, 46 may be more clearly seen.

As depicted in FIG. 7, the magnets 44 in each magnetic device 42 are arranged with their poles longitudinally aligned, and with similar poles of adjacent magnets facing each other. That is, the positive (+) poles face each other, and the negative (−) poles face each other.

The annular magnets 48 of the magnetic device 46 are arranged with their poles radially aligned, and with the poles alternating longitudinally along the magnetic device. That is, one magnet 48 will have a positive pole facing radially outward and a negative pole facing radially inward, and an adjacent magnet will have a negative pole facing radially outward and a positive pole facing radially inward.

Each radially outward facing positive pole of the magnetic device 46 is aligned with an interface between two facing negative poles of the magnetic device 42, and each radially outward facing negative pole of the magnetic device 46 is aligned with an interface between two facing positive poles of the magnetic device 42.

The operating member 26 is preferably made of a ferromagnetic material, which acts to concentrate the magnetic flux due to the magnets 48. The housing 36 in this embodiment is preferably made of a non-magnetic material.

Figure 8:
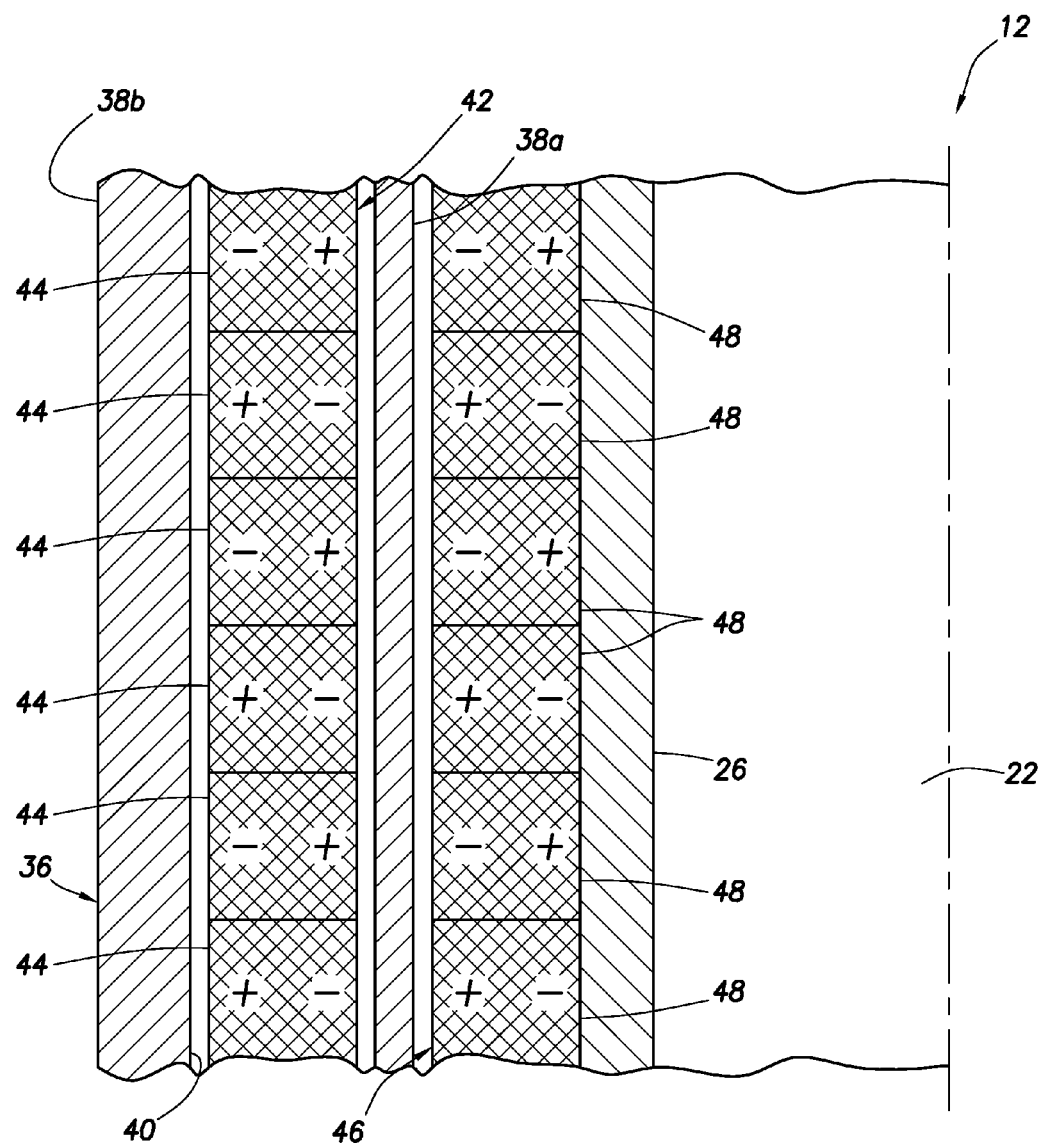

Referring additionally now to FIG. 8, a quarter-sectional view of an alternate arrangement of the magnetic devices 42, 46 is representatively illustrated. In this embodiment, the housing 36 includes inner and outer walls 38a, 38b, as in the embodiment of FIG. 6, with the outer wall 38b being made of a ferromagnetic material and the inner wall 38a being made of a non-magnetic material.

The magnets 48 of the magnetic device 46 are arranged similar to the FIG. 7 embodiment, but the magnets 44 of the magnetic device 42 have their poles radially, instead of longitudinally, aligned. Each radially inward facing positive pole of the magnets 42 now is aligned with a radially outward facing negative pole of the magnets 48, and each radially inward facing negative pole of the magnets 42 is now aligned with a radially outward facing positive pole of the magnets 48.

The ferromagnetic outer housing wall 38b acts to concentrate the magnetic flux due to the magnets 44. In addition, this configuration is expected to reduce friction in displacing the magnetic devices 42 through the chambers 40.

Figure 9:
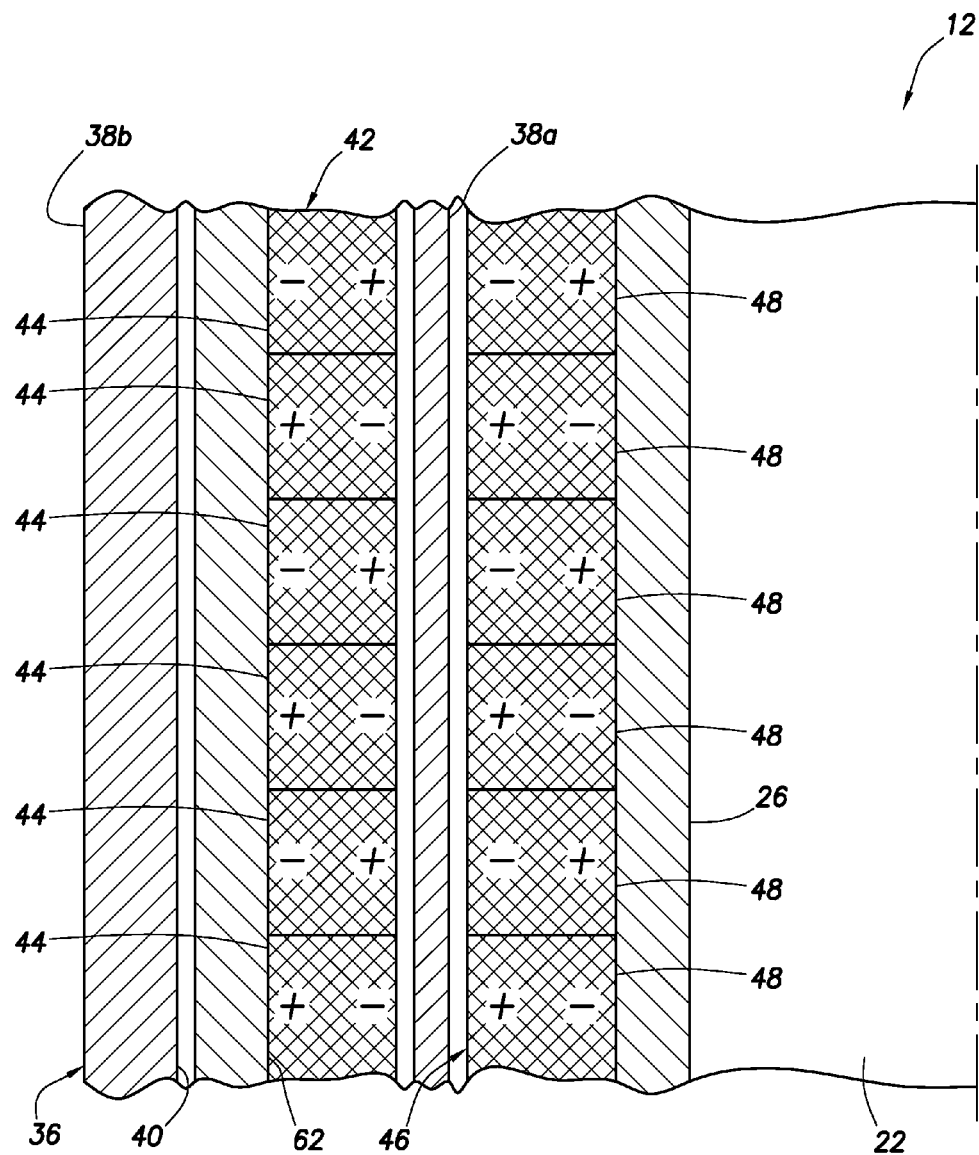

Referring additionally now to FIG. 9, a quarter-sectional view of another alternate arrangement of the magnetic devices 42, 46 is representatively illustrated. In this embodiment, the housing 36 includes inner and outer walls 38a, 38b, as in the embodiment of FIG. 8, but the outer wall 38b and the inner wall 38a are both made of a non-magnetic material.

The magnets 44, 48 are arranged as in the embodiment of FIG. 8, but each magnetic device 42 further includes a flux attractor 62 radially outwardly adjacent the magnets 44. The flux attractor 62 is preferably made of a ferromagnetic material, and acts to concentrate the flux due to the magnets 44. Instead of a single flux attractor 62 in each magnetic device 42, a separate ferromagnetic backing could be provided for each magnet 44, if desired.

Note that the magnetic device 42 of FIG. 9 could be used in place of the magnetic device 42 of FIG. 7. Stated differently, the inner and outer walls 38a, 38b of FIG. 9 could be replaced by the wall 38 of FIG. 7.

It may now be fully appreciated that the principles of the invention enable the safety valve 12 to be constructed in a manner which provides increased magnetic coupling force, as well as increased pressure resisting capability.

Thus has been described the safety valve 12 which includes the housing 36 having multiple chambers 40 extending longitudinally in the pressure bearing wall 38 of the housing. Each of the magnetic devices 42 is reciprocably disposed in a corresponding one of the chambers 40.

The housing wall 38 is preferably made of a non-magnetic material. The chambers 40 and magnetic devices 42 are circumferentially spaced apart in the housing wall 38. Each of the magnetic devices 42 is completely surrounded by the housing wall 38.

The housing wall 38 may be made up of multiple components, such as inner and outer walls 38a, 38b. Structural supports 60 between the chambers 40 may provide contact between the inner and outer walls 38a, 38b to enhance the capability of resisting the pressure differential between the passage 22 and the exterior of the safety valve 12. For example, the supports 60 can transmit force from the outer wall 38b to the inner wall 38a due to pressure exerted external to the safety valve 12, and the supports can transmit force from the inner wall to the outer wall due to pressure exerted within the passage 22.

The magnetic devices 42 are magnetically coupled to the magnetic device 46 attached to the operating member 26 of the safety valve 12. The actuator 50 simultaneously displaces the magnetic devices 42 in the chambers 40. The annular piston 52 of the actuator 50 is connected to each of the magnetic devices 42.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A safety valve for use in a subterranean well, the safety valve comprising:
   a housing surrounding a longitudinal flow passage;
   multiple longitudinal chambers positioned in a space between an outer perimeter of the flow passage and an exterior of the housing; and
   multiple first magnetic devices, each of the first magnetic devices being reciprocably disposed in a corresponding one of the chambers, wherein displacement of the first magnetic device in a first direction permits flow of fluid through the flow passage and displacement of the first magnetic device in a second direction opposite the first direction prevents flow of fluid through the flow passage.

2. The safety valve of claim 1, wherein at least a portion of the housing is made of a non-magnetic material.

3. The safety valve of claim 1, wherein the first magnetic devices are magnetically coupled to a second magnetic device attached to an operating member of the safety valve.

4. The safety valve of claim 1, wherein the chambers and first magnetic devices are circumferentially spaced apart in the space.

5. The safety valve of claim 1, wherein each of the first magnetic devices is completely enclosed within a pressure bearing wall of the housing.

6. The safety valve of claim 1, wherein an actuator of the safety valve simultaneously displaces the first magnetic devices in the chambers.

7. The safety valve of claim 1, wherein the housing is exposed to pressure in the longitudinal passage, and the housing is exposed to pressure external to the safety valve.

8. The safety valve of claim 7, wherein at least one support positioned between the chambers resists a pressure differential between the pressure in the longitudinal passage, and the pressure external to the safety valve.

9. The safety valve of claim 8, wherein the support extends between inner and outer surfaces of the housing.

10. A safety valve for use in a subterranean well, the safety valve comprising:
    a housing surrounding a longitudinal flow passage;
    multiple first magnetic devices;
    a second magnetic device magnetically coupled to the first magnetic devices;
    wherein the first magnetic devices are circumferentially spaced apart in a space between an outer perimeter of the flow passage and an exterior of the housing, thereby encircling the second magnetic device; and
    wherein displacement of the first magnetic devices in a first direction permits flow of fluid through the flow passage and displacement of the first magnetic devices in a second direction opposite the first direction prevents flow of fluid through the flow passage.

11. The safety valve of claim 10, wherein the second magnetic device is attached to an operating member of the safety valve.

12. The safety valve of claim 10, further comprising the housing having multiple chambers extending longitudinally in the space, and wherein each of the first magnetic devices is reciprocably disposed in a corresponding one of the chambers.

13. The safety valve of claim 10, wherein at least a portion of the housing is made of a non-magnetic material.

14. The safety valve of claim 10, wherein the housing is exposed to pressure in the longitudinal passage, and the housing is exposed to pressure external to the safety valve.

15. The safety valve of claim 14, wherein at least one support positioned between the chambers resists a pressure differential between the pressure in the longitudinal passage and the pressure external to the safety valve.

16. The safety valve of claim 15, wherein the support extends between inner and outer surfaces of the housing.

17. The safety valve of claim 10, wherein an actuator of the safety valve simultaneously displaces the first magnetic devices.

18. A safety valve for use in a subterranean well, the safety valve comprising:
    a housing surrounding a longitudinal flow passage; and
    multiple circumferentially spaced apart stacks of first magnetic devices, each of the stacks of first magnetic devices being reciprocably disposed in a space between an outer perimeter of the flow passage and an exterior of the housing,
    wherein displacement of the first magnetic devices in a first direction permits flow of fluid through the flow passage and displacement of the first magnetic devices in a second direction opposite the first direction prevents flow of fluid through the flow passage.

19. The safety valve of claim 18, wherein at least a portion of the housing is made of a non-magnetic material.

20. The safety valve of claim 18, wherein the first magnetic devices are magnetically coupled to a second magnetic device attached to an operating member of the safety valve.

21. The safety valve of claim 18, wherein each stack of first magnetic devices comprises multiple magnetic devices having both north and south poles.

22. The safety valve of claim 18, wherein an actuator of the safety valve simultaneously displaces the first magnetic devices.

23. The safety valve of claim 18, wherein the housing is exposed to pressure in the longitudinal passage and the housing is exposed to pressure external to the safety valve.

24. The safety valve of claim 23, wherein at least one support positioned between the chambers resists a pressure differential between pressure in, the longitudinal passage, and the pressure external to the safety valve.

25. The safety valve of claim 24, wherein the support extends between inner and outer surfaces of the housing.

26. A safety valve for use in a subterranean well, the safety valve comprising:
    multiple first magnetic devices;
    a second magnetic device magnetically coupled to the first magnetic devices;
    wherein the first magnetic devices are spaced apart along a circumference of a pressure bearing wall of a housing and encircle the second magnetic device;
    wherein each of the first magnetic devices is completely surrounded by the housing wall; and
    wherein the second magnetic device is attached to an operating member of the safety valve.

27. A safety valve for use in a subterranean well, the safety valve comprising:
    multiple first magnetic devices;
    a second magnetic device magnetically coupled to the first magnetic devices;
    wherein the first magnetic devices are spaced apart along a circumference of a pressure bearing wall of a housing and encircle the second magnetic device;
    wherein each of the first magnetic devices is completely surrounded by the housing wall; and
    wherein an actuator of the safety valve simultaneously displaces the first magnetic devices.

* * * * *